US009636941B2

(12) United States Patent
Peleg et al.

(10) Patent No.: US 9,636,941 B2
(45) Date of Patent: May 2, 2017

(54) EMBOSSING DIE CREATION

(75) Inventors: Eyal Peleg, Nes Ziona (IL); Shahar Stein, Nes Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

(21) Appl. No.: 14/353,652

(22) PCT Filed: Oct. 27, 2011

(86) PCT No.: PCT/EP2011/068913
§ 371 (c)(1),
(2), (4) Date: Apr. 23, 2014

(87) PCT Pub. No.: WO2013/060375
PCT Pub. Date: May 2, 2013

(65) Prior Publication Data
US 2014/0283699 A1 Sep. 25, 2014

(51) Int. Cl.
*B41C 1/00* (2006.01)
*B29C 67/00* (2006.01)
*B44B 5/02* (2006.01)
*G03G 15/22* (2006.01)

(52) U.S. Cl.
CPC .............. *B44B 5/026* (2013.01); *B41C 1/003* (2013.01); *G03G 15/225* (2013.01); *B29C 67/0051* (2013.01)

(58) Field of Classification Search
None
See application file for complete search history.

(56) References Cited

U.S. PATENT DOCUMENTS 3,354,022 A * 11/1967 Johnson, Jr. et al. ........ 428/167
4,665,492 A * 5/1987 Masters .................. B29C 41/36 264/40.1
4,961,154 A * 10/1990 Pomerantz et al. .......... 345/419
5,121,329 A * 6/1992 Crump .................... B22F 3/115 228/180.5
5,312,654 A * 5/1994 Arimatsu et al. ............. 427/511
5,893,658 A * 4/1999 Kellie ................ G03G 15/0152 399/231
6,164,850 A * 12/2000 Speakman ............... 400/120.09
6,283,031 B1 * 9/2001 Kakuta et al. ................ 101/466
(Continued)

FOREIGN PATENT DOCUMENTS

EP 2199065 A1 6/2010
EP 2412516 A2 2/2012
WO 2004/009364 A1 1/2004

OTHER PUBLICATIONS

International Search Report and Written Opinion for PCT/EP2011/068913 dated Aug. 2, 2012, 10 pp.

*Primary Examiner* — Jill Culler
(74) *Attorney, Agent, or Firm* — HP Inc. Patent Department

(57) ABSTRACT

An embossing die is created by printing multiple ink layers (530, 540) in superposition thereby to build up a printed relief pattern (510) in accordance with received design data specifying a design to be embossed. The design data is modified after receipt to introduce into the printed relief pattern to be built, one or more channels (610) which extend depth-wise through multiple ink layers of the printed relief pattern (510) and serve to fully or partially segment the printed relief pattern.

17 Claims, 8 Drawing Sheets

(56) References Cited

U.S. PATENT DOCUMENTS

| | | | | |
|---|---|---|---|---|
| 6,520,084 | B1 * | 2/2003 | Gelbart | 101/401.1 |
| 7,813,661 | B2 * | 10/2010 | Yacoub | G03G 15/1625 399/308 |
| 2010/0104687 | A1 * | 4/2010 | Kaplan | 426/3 |
| 2011/0249048 | A1 * | 10/2011 | Gullentops | B29C 67/0059 347/5 |

* cited by examiner

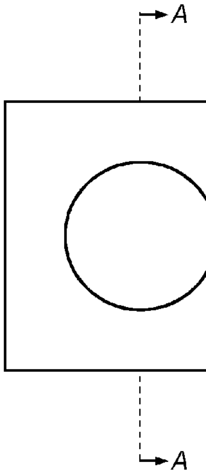
Fig. 5A
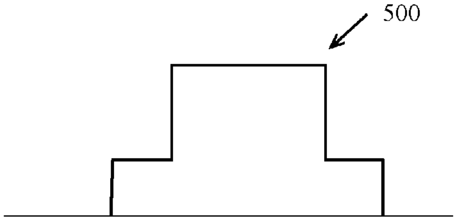
Fig. 5B
Fig. 6
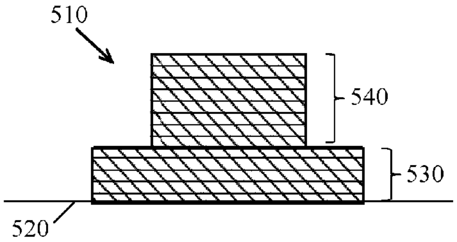
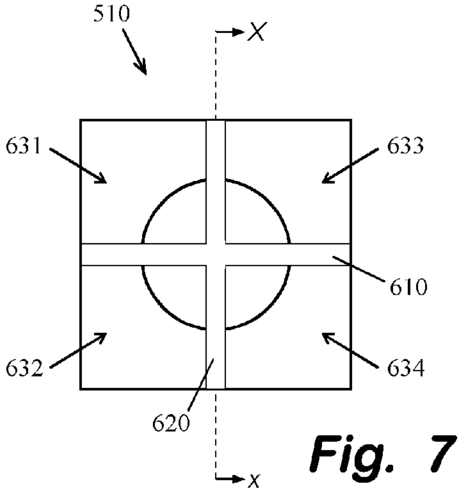
Fig. 7
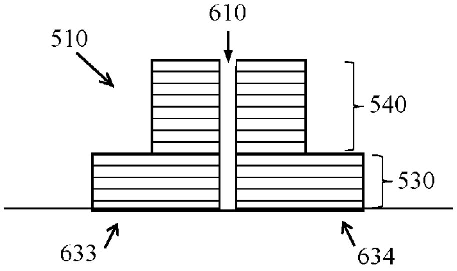
Fig. 8

EMBOSSING DIE CREATION

BACKGROUND

Embossing is sometimes used to create raised images and designs in printed paper or other printed media. These raised images provide texture, emphasis, and visual effects to the media. The embossed images can include a variety of additional characteristics, including printed images, gloss, lamination, or security features.

Embossing is normally performed as a post printing process on dedicated embossing machinery. Embossing machines typically involve the design and manufacture of a two piece die. The embossing machines place a portion of the media between the two pieces and then press the two pieces of the die together. This mechanically deforms the media to create the embossed image. These embossing techniques have a number of disadvantages, including the delay in manufacturing the die, the cost of purchasing/maintaining separate embossing machines, and the significant amount of effort involved in the separate post-printing embossing run.

In an as-yet unpublished patent application in common ownership with the present application, an embossing process has been proposed which uses an embossing die created as a printed relief pattern made up of multiple layers of a deposited material such as a digital ink. Examples of the present invention concern refinements to the creation of creating embossing dies in this manner and to dies so created.

BRIEF DESCRIPTION OF THE DRAWINGS

Examples of the invention will now be described, by way of non-limiting example, with reference to the accompanying diagrammatic drawings, in which:

FIGS. 5A and 5B are plan and profile views of an example embossing design;

FIG. 8 is a cross-section through a printed relief pattern forming an embossing die for embossing media with the FIG. 5 design;

FIG. 7 is a plan view of an embossing die similar to the die of FIG. 6 but fully segmented into four regions by channels incorporated into the die in accordance with an example of the invention;

FIG. 8 is a cross-section through the FIG. 7 embossing die;

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to “an example” or similar language means that a particular feature, structure, or characteristic described in connection with the example is included in at least that one example, but not necessarily in other examples.

Figure 1:
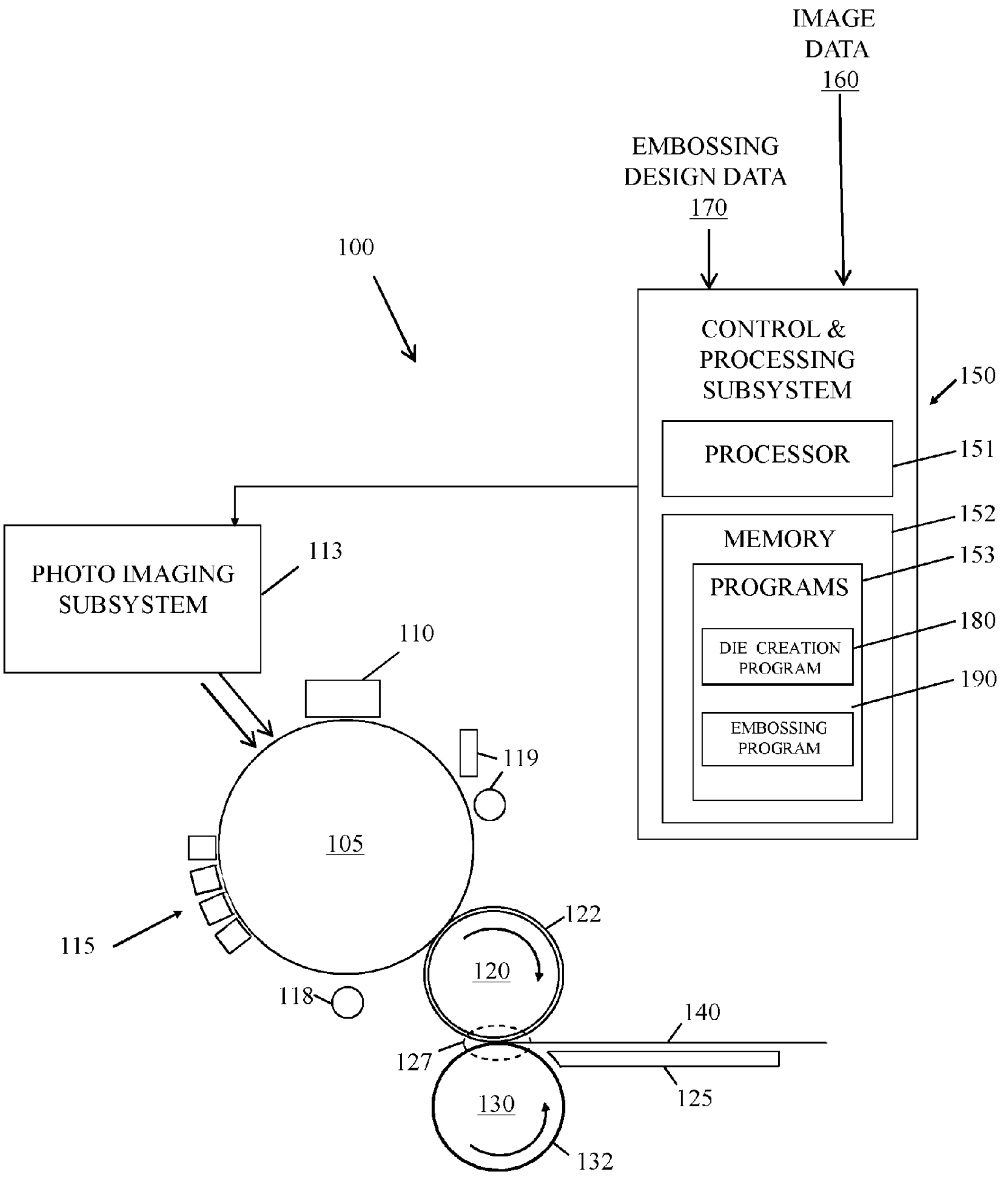
FIG. 1 is a diagram of an illustrative digital Liquid Electro Photographic (LEP) printing system.

FIG. 1 depicts an example printing system that can be used to implement above-mentioned previously-proposed embossing process in which a printed relief pattern made up of multiple layers of a deposited material is used as an embossing die against which a medium to be embossed is then pressed. The FIG. 1 example printing system comprises a known form of liquid electrostatic printing (LEP) print engine 10; it is, however, to be understood that other forms of printing system (including inkjet printers and xerographic printers as well as laser printers) can also be used to create an embossing die formed by a printed relief pattern made up of multiple layers of a deposited material. The printing system used to form the embossing die for embossing a print medium can be the same as used to form ink images on the medium; alternatively, different printers can be used to form the embossing die and to print images on the print medium. Using the same printer both for forming an embossing die as a printed relief pattern and to print images on the media has the advantage of integrating the embossing process into the normal printing flow within the printer thereby minimizing delay, handling, and other overheads associated with traditional embossing systems.

As used in the specification and appended claims, the term “printed relief pattern” refers to ink structures having a thickness or height sufficient to emboss a media pressed against the printed relief pattern. For example, a typical printed relief pattern may have a height of between approximately 0.1 millimeters and 2 millimeters or more. Factors which may influence the height of printed relief pattern include: the desired height of the embossed image, the capacity of the printing technique in depositing ink layers, and the structural characteristics of the cured or dried ink. As used in the specification and appended claims, the term “ink” refers broadly to material deposited onto a surface by a printer or press. For example, the term “ink” includes liquid toners, dry toners, UV cured inks, thermally cured inks, inkjet inks, pigment inks, dye based inks, solutions without colorant, solvent based inks, water based inks, plastisols, or other appropriate solutions.

Before describing use of the FIG. 1 LEP print engine 100 for creating an embossing die in the form of a printed relief pattern (and subsequent use of the die to emboss a print medium), a description will first be given of the form and operation of the LEP print engine 100 in its normal role of printing images on a print medium.

The form of LEP print engine 100 shown in FIG. 1 is a digital offset print engine arranged to print color images using four marking inks, for example: cyan, magenta, yellow and black inks. Each ink, here in the form of a liquid toner, is printed in turn in a respective operating cycle in which a uniform electrostatic charge is first applied, by a charge roller or other suitable charging device 110, to a photoconductive drum 105 (for example, formed by a thin film of photoconductive material, commonly referred to as a photo imaging plate (PIP), wrapped around the outer surface of a cylindrical body). After the drum 105 has been fully charged, a photo imaging sub-system 113 exposes selected areas of the photoconductive drum 105 to light in the pattern of the desired printed image for the ink to be printed thereby dissipating the charge on the areas exposed to the light. In discharge area development (DAD), for example, the discharged areas on the drum 105 form an electrostatic image which corresponds to the image to be printed. This electrostatic image is said to be a "latent" image because it has not yet been developed into a toner image. A thin layer of liquid toner is then applied to the drum 105 using a developer unit 115, commonly referred to as a binary ink developer (BID) that supplies ink to a small roller that rotates against drum 105. There is a respective developer unit 115 for each ink.

The latent image on the drum 105 is developed through the application of the liquid toner which adheres to the discharged areas of the drum 105 in a uniform layer developing the latent electrostatic image into a toner image. The toner image is transferred from the drum 105 to a heated intermediate transfer roller 120 (the 'blanket' cylinder) and then from the blanket cylinder 120 to a print medium 140. The print medium 140 has previously entered the printing system 100 from the right (with reference to FIG. 1), and after passing over a feed tray 125, has been wrapped onto an impression cylinder 130 that is pressed against the blanket cylinder 120. Transfer of the single color ink image on the blanket cylinder 120 to the print medium 140 takes place as the latter passes through a nip 127 between the blanket cylinder 120 and the 'impression' cylinder. The blanket cylinder 120 has a resilient outer layer 122 which facilitates the transfer of the image from the blanket cylinder 120 to the print medium 140 under the contact pressure developed in the nip 127.

As the photoconductive drum 105 continues its rotation, an LED lamp or other suitable discharging device 118 removes residual charge from the drum 105 and toner residue is removed at a cleaning station 119 in preparation for developing another image or for applying a subsequent toner color plane (it being understood that, depending on the size of the drum 105, one full rotation of the drum 105 may accommodate the transfer of one or multiple toner color planes).

To form a single color image (such as a black and white image), one pass of the print medium 140 through the nip 127 between the impression cylinder 130 and the blanket cylinder 120 completes the desired image. For a color image, the print medium 140 is retained on the impression cylinder 130 and makes multiple contacts with the blanket cylinder 120 as it passes through the nip 127. At each contact, an additional color plane may be placed on the print medium 140.

For example, to generate a four color image, the photo imaging subsystem 113 forms a second pattern on the photoconductive drum 105 which receives the second ink color from a second BID unit 115. As described above, this second ink pattern is transferred to the blanket cylinder 120 and impressed onto the print medium 140 as it continues to rotate with the impression cylinder 130. This continues until the desired image with all four color planes is formed on the print medium. Following the complete formation of the desired image on the print medium 140, the print medium 140 can exit the machine or be duplexed to create a second image on the opposite surface of the print medium 140. Because the printing system is digital, the operator can change the image being printed at any time and without manual reconfiguration.

The print engine 10 is controlled by a control and processing subsystem 150 that is operatively coupled to the print engine and typically takes the form of a program controlled processor 151, and associated computer-readable storage medium (memory) 152 comprising both volatile and non-volatile sections. The memory 152 stores a set of programs 153 for causing the processor 151 to control the operation of the printing engine 100 and to carry out processing such as initial color management processing and halftone processing of input image data 160 to derive signals for controlling the photo imaging sub-system 113. The memory 152 also serves as a temporary store for intermediate processing results. It will be appreciated that the control and processing subsystem 150 may take other forms such as dedicated hardware (for example an ASIC or suitable programmed field programmable array).

A description will next be given as to how the digital offset LEP print engine 100 can be used to implement the above-mentioned previously-proposed embossing process by first creating an embossing die as a printed relief pattern and then using the die to perform embossing.

To create an embossing die, the print engine 100 builds up a printed relief pattern by successively printing multiple ink layers on a substrate. For digital offset LEP print engines of the FIG. 1 form, the substrate on which the printed relief structure is built can conveniently be formed by an impression layer 132 that normally covers the impression cylinder 130. In normal print operations, this impression layer 132 serves to absorb and capture excess ink thereby to minimize maintenance and image quality issues. For example, when a paper jam occurs, ink intended for the absent paper may be instead deposited on the impression layer 132. As part of the jam clearing process, the operator may replace the impression layer 132 before restarting the printing operation. The design of the print engine 100 facilitates the rapid and convenient replacement of the impression layer 132. As a consequence, the impression layer 132 is well suited for use as the substrate for building an embossing die since it is relatively easy to remove and replace after use of the die has finished. However, it is to be understood that process of forming an embossing die as a printed relief pattern is not limited to print engines that use an impression layer for normal printing as it will generally be straightforward to adapt other forms of print system to provide a substrate on which to build the printed relief pattern. It is also to be understood that for the FIG. 1 print engine 100, the material composition of the impression layer 132 when used as a substrate for building an embossing die may differ from its composition when used in its normal role of absorbing excess ink.

The form of the printed relief pattern built up on the impression layer 132 is determined by embossing design data 170 received by the control and processing sub-system 150. As used in the specification and appended claims, the term "design data" refers to data that specifies, in any suitable format, the two or three-dimensional shape of the design to be applied by embossing and thus the shape of the embossing die to be formed—where only a 2D shape is specified, this is the footprint that the die is to make on the media to be embossed as considered in the plane of the latter (in this case, the height of the die that determines the height of embossing, is, for example, preset into the print engine, either as a fixed value or a value that depends, for example, on the thickness of the media to be embossed). The term "design data" encompasses not only the design data as initially received, but also subsequent translations of form of this data (for example, the "layer data" described below), and modified versions (in particular, to introduce channels as will be described below).

Furthermore, as used in the specification and appended claims, the "height" of the embossing die refers to the die dimension extending at right angles to the plane of the substrate on which the die is built whereas the "length" and "breadth" of the embossing die refer to its dimensions in orthogonal directions parallel to the plane of the substrate with "length" being in the process direction of the print engine and "breadth" transverse to the process direction (for the FIG. 1 print engine, the process direction being the circumferential direction of drum 105 cylinders 122, 132 and the media feed direction).

Figure 2A:
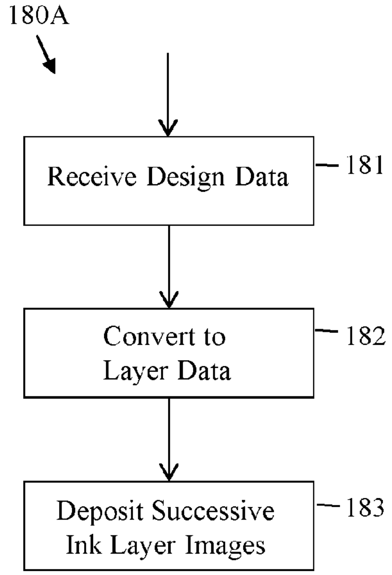
FIGS. 2A-C show respective flow charts of three different forms of die creation program for use in the FIG. 1 system.

Prior to creating an embossing die, the media feeding through the digital offset LEP print engine 100 is temporarily stopped. A die creation program 180A is then initiated, the main steps of this program being depicted in FIG. 2A. After receiving the embossing design data 170 in step 181, the die creation program 180A proceeds to step 182 that determines the number and form of ink layers to be printed in order to build up a printed relief pattern corresponding to the embossing die specified by the design data 170 (the thickness of a printed ink layer, which may be ink dependent, being known or accessible to the program 180A). The number and form of ink layers determined in step 182 (hereinafter, the 'layer data') is temporarily stored. In step 183, the layer data is accessed one layer at a time, starting with the lowest layer, and used to control the printing of corresponding images on the impression layer 132 to accumulate and build up a three dimensional relief ink image to serve as the embossing die. The ink deposition process occurs as described above, with an electrostatic image being created on the photoconductive drum 105 and the drum 105 receiving ink from a BID unit 115 to form an ink image on the photoconductive drum 105. The image is transferred to the surface of the resilient layer 122 on the blanket cylinder 120 and then to the impression layer 132. The ink image is cured on the impression layer 132. This process is repeated to deposit multiple layers of cured ink and forms the printed relief pattern that serves as an embossing die. In some implementations, the process may pause after the deposition of one or more ink layers or may incorporate null printing cycles where no ink is deposited.

FIG. 3 illustrates the formation of an embossing die on an impression layer 132 as a result of operation of the print engine 100 under the control of the die creation program 180A, and the embossing of a print medium using this die. More particularly, FIG. 3A is a cross sectional diagram of the impression layer 132 with several ink structures 210, 215 beginning to be formed. Additional ink layers are deposited to further build up the ink structures 210, 215. FIG. 3B is a cross sectional diagram of the impression layer 132 with the completed printed relief pattern 205. The printed relief pattern 205 may be formed from a plurality of ink layers each of which, in the present example, may be approximately 0.5 to 1 micron in thickness. The structures may include hundreds of layers, each of which can be individually shaped to create the desired structure. In this example, a first structure 210 has a rectangular body with a rounded top. This rounded top may be created by depositing ink layers with progressively smaller areas of ink on top of the rectangular body. The taller structure 215 on the right has more layers than the first structure 210 and is consequently taller. The taller structure 215 has a terraced shape formed by depositing a series of two distinctly different shaped ink layers. The lower portion of the structure 215 is formed from ink layers with larger areas and the upper portion of the structure 215 is formed by depositing ink layers with smaller areas.

The ink used to form the structures 210, 215 may be any color or may have no color at all. The ink is selected so that its mechanical properties facilitate the formation of a printed relief pattern. For example, the ink may be selected for its adhesive or structural characteristics. In some implementations, different inks may be used in different layers of the structures. For example, an adhesive ink may be used as a first layer to securely bind the structures to the impression layer. The other layers may be built using inks which have more structural properties and are designed to withstand repeated compression during the embossing process. A top layer may be selected so that it does not stick to the media that is being embossed.

Figure 3A:
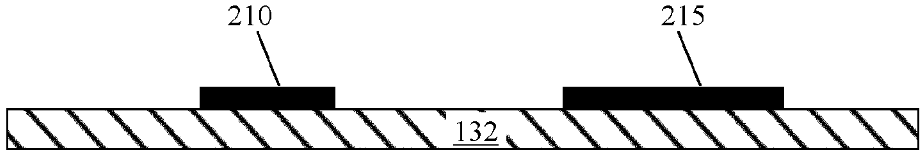
FIGS. 3A-D are cross-sectional diagrams through a printed relief pattern at different stages of its construction and during its subsequent use as an embossing die according to previously-proposed embossing process.
Figure 3B:
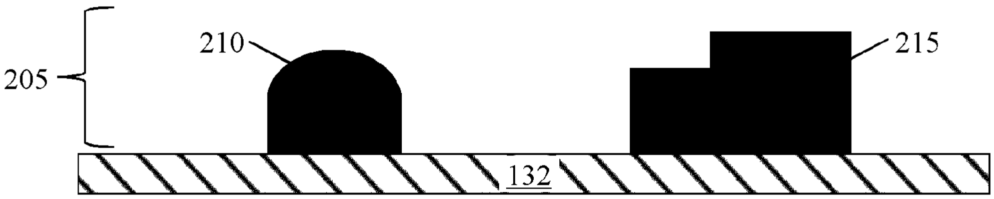
Figure 3C:
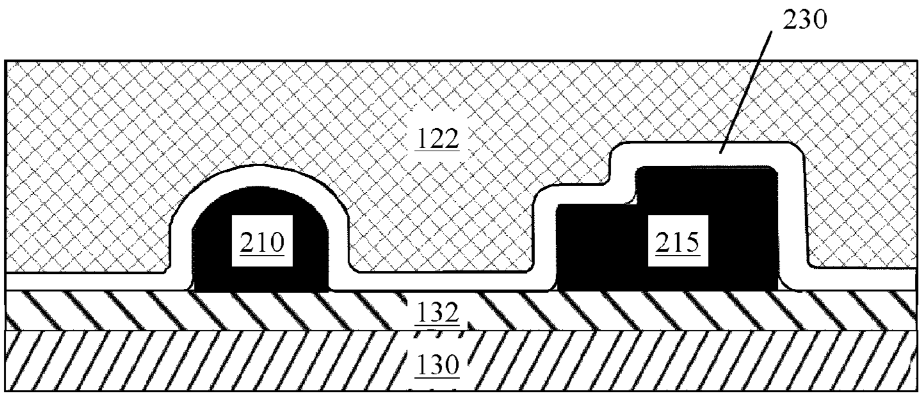
Figure 3D:
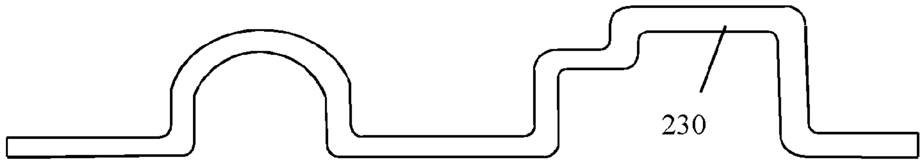

FIG. 3C shows a sheet of media 230 that has been placed over the ink structures 210, 215. The structures 210, 215 of the printed relief pattern are supported by the impression layer 132 and the impression cylinder 130. The sheet of media 230 is pressed against the printed relief pattern 205 by a resilient body. In the present example, the resilient body is the layer 122 of the blanket cylinder 120 but the resilient body could be implemented in many other ways including a compliant plate, a roller, or other suitable device. In the nip 127 where the surfaces of the blanket cylinder 120 and impression cylinder 130 are in closest proximity, the resilient layer 122 can exert a predetermined amount of pressure on the media 230 and force the media 230 over and into the ink structures 210, 215 which make up the printed relief pattern 205 (FIG. 3B). This creates an embossed image on the media (230) that corresponds to the underlying printed relief pattern 205. FIG. 3D shows a portion of the media 230 with an embossed shape/image that corresponds to the printed relief pattern 205.

It is to be noted that the design represented by the embossing design data 170 (typically, a human-recognizable design) may either be directly represented by the printed relief pattern and therefore reproduced as raised areas of the media after embossing, or may be represented by the non-raised or less raised areas of the printed relief pattern and therefore reproduced as relatively depressed areas of the media after embossing. Accordingly, as used in the specification and appended claims, the term "embossing" is used broadly to include both raised areas and depressed areas formed in a media surface.

The diagram shown in FIG. 3C is only an illustrative example of how embossing is effected. A number of modifications could be made according to the design parameters for a particular task. For example, an adhesive layer or material could be added to increase adhesion of the ink relief pattern to the impression layer 132. This adhesive material may be deposited in a number of ways. For example, the printer may deposit the adhesive material on the impression layer prior to depositing the ink layers, the adhesive material may be coated onto the impression layer during manufacturing, or the adhesive material may be manually deposited on the impression layer.

Figure 4:
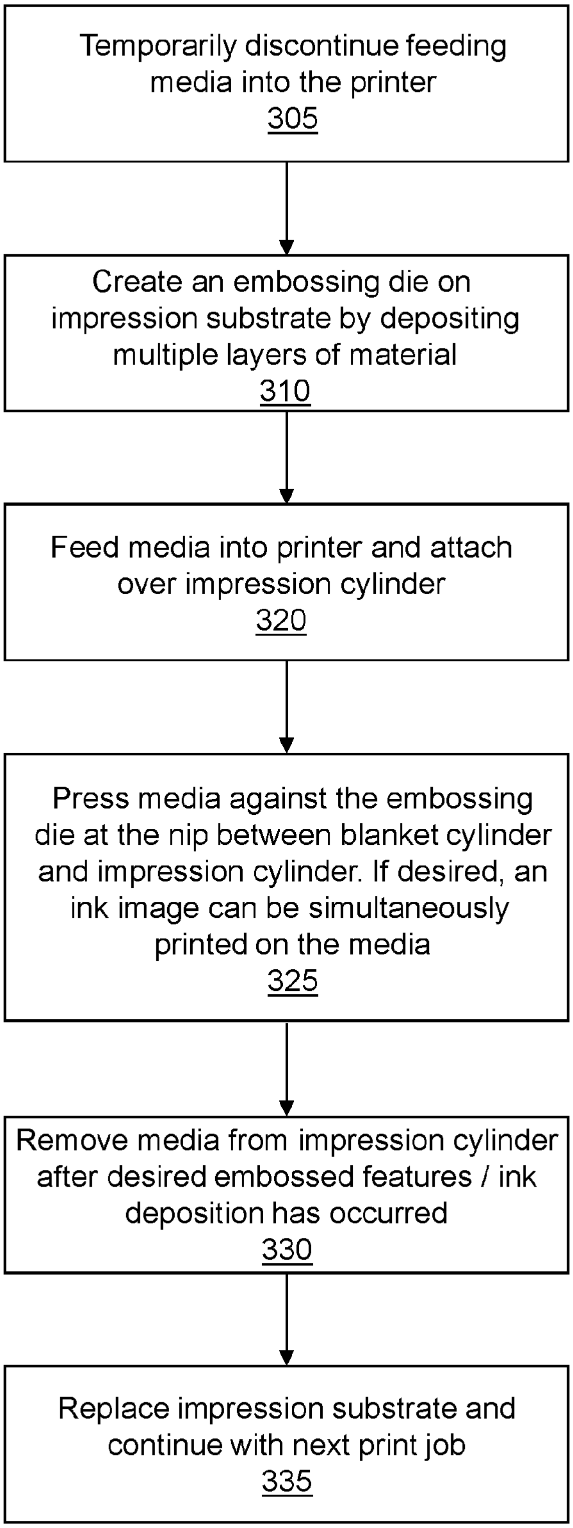
FIG. 4 is a flowchart of an illustrative implementation of the previously-proposed embossing process.

FIG. 4 depicts in overview an illustrative method 300 for implementing digital embossing as described above in FIGS. 3A-3D on the LEP print engine 100 of FIG. 1. The method 300 includes temporarily discontinuing the feeding of media into the print engine 100 (block 305) while allowing the photoconductive drum 105 continues to rotate. On the basis of the embossing design data 170 received at the print engine 100, a first ink layer image for forming the first layer of the embossing die is developed on the photoconductive drum 105. This image is transferred to the blanket cylinder 120 and then onto the impression layer 132. As discussed above, the impression layer 132 is wrapped around and rotates with the impression cylinder 130. Further ink layer images are subsequently developed and transferred to the impression layer 132 in accordance with the received design data and as this process continues the embossing die is built up layer by layer on the impression layer 132 (block 310). For example, the printer may transfer ten or more ink layers to the impression layer per second. Consequently, creating an embossing die containing hundreds of layers can be accomplished in tens of seconds. The properties of LEP inks allow deposition of many printing ink layers on top of previous layers. The creation of the embossing die is, for example, carried out under the control of the die creation program 180A described above with reference to FIG. 2A.

After the embossing die is formed, print medium 140 is again fed into the print engine 100 and attached over the embossing die on the impression cylinder 130 (block 320). A wide variety of media can be used. For example, cellulose based media ranging from 60 grams per meter square to 350 grams per meter square have been used. Other types and weights of media can also be used. As each sheet of media passes though the nip 127, it is pressed against the embossing die (block 325). As discussed above, this embosses the media by pressing it over and into the ink structures which make up the embossing die. If desired, an ink image could be simultaneously printed on the media.

The media 140 may be retained on the impression cylinder for a number of revolutions. Each time the media passes through the nip 127, it is again pressed over the printed relief pattern. For example, the impression cylinder 130 may rotate the media through the nip four times before releasing the media. This may have a number of advantages, including sharper embossed images and an opportunity to print an image on the media with four color layers. The number of passes through the nip can be adjusted according to the characteristics of a given print run.

The pressure and temperature of the blanket cylinder 120 and the impression cylinder 130 can be controlled to produce the desired embossed image. The pressure can be controlled by adjusting the distance between the two cylinders and/or adjusting the resiliency/thickness of the resilient layer 122. The temperature of the cylinders and resilient layer can be adjusted by controlling heat flux into and out of the cylinders. For example, the temperature may be increased using radiative, convective, or conducted heat. The temperature may be lowered by reducing the input heat flux or increasing a cooling convective flow.

As indicated, the print engine 100 may also deposit ink on the media as it is performing the embossing. The deposition of ink on the media is performed as described above with respect to FIG. 1. The ink may be deposited over any region of the media, including areas with embossing and areas with no embossing. The embossed media is removed from the impression cylinder 130 after the desired embossed features and ink deposition has occurred (block 330).

This process is then repeated by feeding the next sheet of media into the print engine 100 (block 320), pressing the media into the relief image (block 325) and removing the media (block 330). The process continues until the embossing run is complete. For example, the embossing die may be used to emboss runs that range from a single sheet of media to hundreds or thousands of sheets. Tests have shown that a single embossing die is sufficient to print at least 600 sheets of media. If the embossing die becomes damaged or worn, the media printing/embossing process can be momentarily stopped while the print engine deposits additional layers on the embossing die to correct the embossing die. Alternatively, the impression layer 132 can be replaced and the embossing die can be built over again. After the printing is complete, the impression layer 132 is replaced and printing continues as usual with the next print job (block 335).

The overall embossing method 300 illustrated in FIG. 3 may be effected under the control of an embossing program 190 that controls the print engine 100 (typically in an interactive manner with an operator who is tasked to carry out certain operations and provide appropriate input to the program 180A on completion of each such operation).

The description of embossing using printed relief patterns created on a LEP printer is only an illustrative example. A variety of other printing methods and systems could be used to create embossing dies as printed relief patterns and to use such dies to emboss media.

For example, the embossing die can be created offline (the term "offline" as used in the specification and appended claims refers to a system, printer or process which operates independently from the embossing system that actually embosses the media). Thus, in one example, an embossing die is formed on a substrate using an offline inkjet printer that deposits UV cured polymer inks or thermally curable inks. The ink layers created by UV cured polymer inks can be significantly thicker than ink layers deposited by the LEP printing process. Consequently, fewer ink layers may form the desired embossing die. The substrate may be formed from any of a number of materials, including film, plastic, KAPTON, or other material. After the embossing die has been formed offline, it is transferred to the embossing system (for example, to the impression cylinder 130 of the FIG. 1 print engine 100). To properly align the embossing die, an alignment image or images can be printed on the impression layer of the impression cylinder of the embossing system. The embossing die can be adhered to the impression cylinder in a number of ways, including adhesive, vacuum suction, electrostatic forces, clamping or other techniques.

In another example method of creating an embossing die as a printed relief pattern and then using the die to emboss media, the embossing die can be created on the same system as used for printing and embossing the media but by a different print engine to that used for printing the media. For example, an inline printer can be used to create printed relief patterns directly on the impression layer of the impression cylinder of an LEP print system. The inline printer may use a variety of technologies to deposit the printed relief pattern on the impression layer. For example, the inline printer may be an inkjet which deposits UV curable inks onto the impression layer. The inline printer may include an inkjet printhead and a UV curing station. The printhead may be configured to deposit only one color of UV ink or it may be configured to print a full pallet of UV inks. In one example, the inline printer may print a colorless ink onto the impression layer.

It has been found that for an embossing die created as a printed relief pattern generally in accordance with the example methods described above (and thus typically a few hundreds of microns thick), unavoidable changes in the dimensions of the completed printed relief pattern, tend to reduce adhesion between the printed relief pattern and its carrying substrate. These changes of dimensions of the printed relief patter are thought to result from a combination of factors including drying of the ink making up the printed relief pattern, and cooling of the printed relief pattern once ink deposition has ceased (for an LEP print engine, the ink temperature on the blanket cylinder before its deposition onto the impression layer forming the substrate on which the printed relief pattern is built, is around 100° C. whereas the completed printed relief pattern will be much closer to room temperature).

Under certain conditions the reduction of adhesion of the printed relief pattern to its substrate can lead to peeling of the printed relief pattern from the substrate without any external force. The likelihood of such autonomous peeling occurring increases with the dimensions of the printed relief pattern (both in directions parallel to the plane of the substrate and height-wise). Thus, for example, areas of the printed relief pattern having a length or breadth greater than 10 to 20 mm, were found to be prone to autonomous peeling for most practically useful embossing heights. For pronounced embossing heights, even smaller areas were found to be prone to peeling.

In order to mitigate the above-described undesirable tendency of the printed relief pattern to autonomously peel away from its supporting substrate, examples of the present invention modify the embossing design data after receipt to introduce into the printed relief pattern to be built, one or more channels which extend depth-wise through multiple ink layers of the printed relief pattern and serve to fully or partially segment the printing relief pattern. As used herein, "depth-wise" refers to the direction opposite to the height direction of the embossing die.

Segmenting at least the larger regions of the printed relief pattern has been found to reduce the tendency of the printed relief pattern to autonomously peel away from its supporting substrate.

It will be appreciated that channels introduced to segment a printed relief structure manifest themselves as aligned elongate apertures in the ink layers that are deposited to build up the printed relief structure.

As used in the specification and appended claims, the term "fully segment", in relation to the effect of introducing one or more channels into the printed relief pattern, refers to separation of the printed relief pattern into isolated regions unconnected by any ink layer; in contrast, the term "partially segment" refers to the situation where the one or more channels are of insufficient extent to fully isolate regions of the printed relief pattern from one another (either because the channel, or at least one of the channels, only extends depth-wise through some of the ink layers such that the bottom and/or top of at least a length of the channel is spanned by an ink layer, or does not extend right across the printed relief pattern but terminates short of an edge of the printed relief pattern that it would otherwise meet). Where "segment" (verb), "segmentation" and related words are used herein without qualification, they are to be understood as encompassing both partial and full segmentation.

Partial segmentation although potentially not as effective in reducing the tendency of the printed relief pattern to autonomously peel away, will generally have a smaller impact on the stability of the printed relief pattern than a corresponding full segmentation.

Example full and partial segmentations of the simple embossing design depicted in FIG. 5 will now be described. FIGS. 5A and 5B respectively show plan and profile views of a design 500 to be applied by embossing to a print media (for clarity, the dimension of the design defining the embossing height is shown exaggerated in FIG. 5 and subsequent Figures). As can be seen, the general form of the design 500 comprises a central cylinder atop a square plinth. FIG. 6 shows, in cross-section, an embossing die 510 made to the design 500 by the printing of multiple ink layers in superposition on substrate 520 to build up a printed relief pattern 510; the FIG. 6 cross-section is taken on dashed line A-A with reference to the plan view of the design shown in FIG. 5A. As can be seen in FIG. 6, the portion of the printed relief pattern 510 corresponding to the square plinth portion of the design is formed by printed ink layers 530 and the portion of the printed relief pattern 510 corresponding to the central cylindrical portion of the design is formed by printed ink layers 540. It will be appreciated that, in practice, each of the ink layers making up layers 523, 540 are relatively much smaller in depth than depicted (and, consequently, the number of ink layers will typically be much greater than shown). In FIG. 6 and subsequent Figures, the layering of the ink layers is generally depicted by solid horizontal lines when the printed relief pattern is viewed in elevation even when the view concerned is a cross-sectional view (in the latter case, the sectioned layers are shown with diagonal hatching as in FIG. 6).

FIGS. 7 and 8 depict the full segmentation of the printed relief pattern 510 by the introduction of two orthogonal channels 610, 620 that extend the full depth of the printed relief pattern (that is, through all ink layers) and uninterrupted right across the full length/breadth of the printed relief pattern. FIG. 7 is a plan view of the printed relief pattern 510 and FIG. 8 is a cross-section through the latter on line X-X of FIG. 7. As can be seen, the channels 610, 620 serve to divide the printed relief pattern 510 into four isolated regions 631, 632, 633 and 634 unconnected by any ink layer.

FIGS. 9 and 10 depict five examples of partial segmentation of the printed relief pattern 510 by the introduction of two orthogonal channels 610A-E, 620A-E channels that are of insufficient extent to fully isolate regions of the printed relief pattern from one another either because the channels do not extend depth-wise through all ink layers or do not extend right across the printed relief pattern. FIGS. 9A-E show respective plan views of the printed relief pattern 510 for each of the five partial segmentation examples, and FIGS. 10A-E shown corresponding cross-sections taken on lines X-X of FIGS. 9A-E respectively.

Figure 9A:
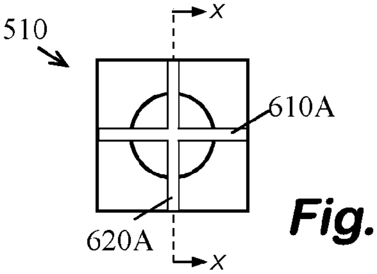
FIGS. 9A-E are respective plan views of an embossing die, similar to the die of FIG. 5, each showing a different partial segmentation of the die by channels incorporated into the die in accordance with respective examples of the invention.
Figure 10A:
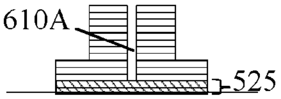
FIG. 10A-E show cross-sections through the embossing dies of FIGS. 9A-E respectively.

In the first partial segmentation example depicted in FIGS. 9A and 10A, the channels 610A, 620A do not fully segment the printed relief pattern 510 because the channels do not extend down into the lowest two ink layers 525.

Figure 9B:
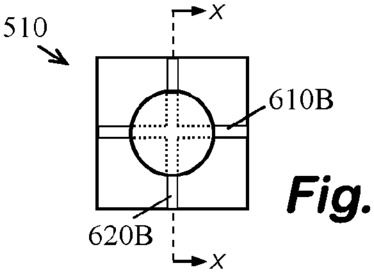
Figure 10B:
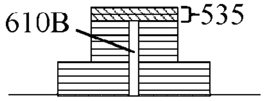

In the second partial segmentation example depicted in FIGS. 9B and 10B, the channels 610B, 620B do not fully segment the printed relief pattern 510 because the channels do not extend up into the highest two ink layers 535 in the central cylindrical region of the printed relief pattern; in this example, the channels are enclosed over the middle part of their extent but are open towards each end. It should be noted that effecting partial segmentation in the manner depicted in FIGS. 9B, 10B relies on the fact that, provided the width of a channel is not too great (for example, no more than 30 micrometers), it is possible to deposit an ink layer, such as the lower one of the layers 535, over the channel without the channel-spanning portion of the layer falling away into the channel.

Figure 9C:
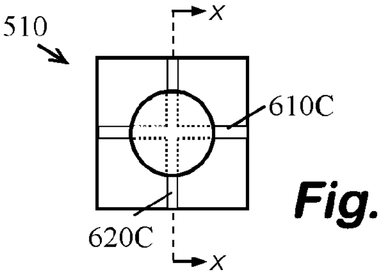
Figure 10C:
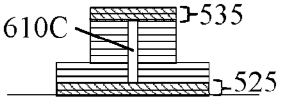

The third partial segmentation example depicted in FIGS. 9C and 10C is a combination of the first and second partial segmentation examples; in this third example, the channels 610C, 620C do not fully segment the printed relief pattern 510 because the channels neither extend down into the lowest two ink layers 525 nor up into the highest two ink layers 535.

Figure 9D:
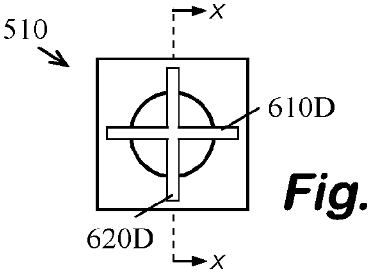
Figure 10D:
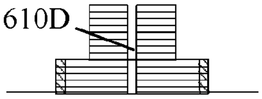

In the fourth partial segmentation example depicted in FIGS. 9D and 10D, the channels 610D, 620D extend through all ink layers but do not fully segment the printed relief pattern 510 because the channels do not extend right to the outside edges of the printed relief pattern 510.

Figure 9E:
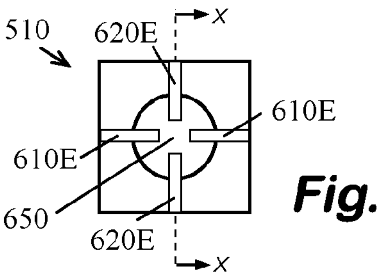
Figure 10E:
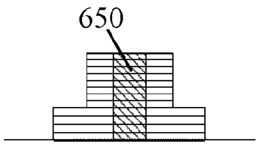

In the fifth partial segmentation example depicted in FIGS. 9E and 10E, the channels 610E, 620E extend through all ink layers but do not fully segment the printed relief pattern 510 because each channel is split into two sections (both given the same reference in FIG. 9E) that do not join up in the central portion 650 of the printed relief pattern 510.

Where channels that have been introduced to segment a printed relief pattern forming an embossing die, open through the top printed ink layers, there exists the possibility that the channels will be visible in media embossed using the die. However, it has been found that provided the width of the channels is kept to less than the thickness of the media to be embossed (and typically to half the media thickness), the presence of the channels is generally indiscernible, or only weakly discernible, in the embossed media.

Figure 2B:
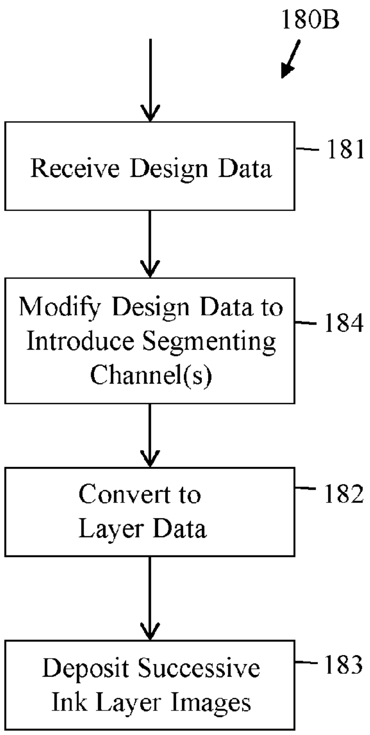
Figure 2C:
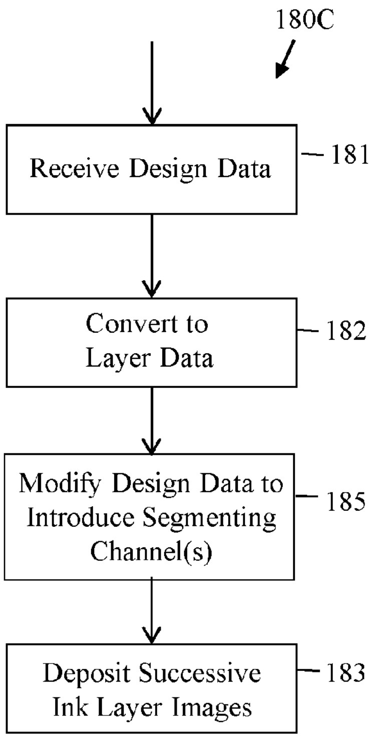

Modifying the received embossing design data to introduce one or more channels into a printed relief pattern to be built, can be effected before, during or after conversion of the received design data into the layer data defining the ink layer images to be printed. Thus, FIG. 2B depicts a die creation program 180B similar to that shown in FIG. 2A but adapted to modify the received design data to introduce channels during a step 184 that precedes the step 182 of converting the design data to layer data. In contrast, FIG. 2C depicts a die creation program 180C similar to that shown in FIG. 2A but adapted to modify the received design data to introduce channels during a step 185 that follows the step 182 of converting the design data to layer data (although it is the layer data specifying each ink layer that is modified in this example, it will be appreciated that the layer data is simply one form of expression of the design data). Rather than step 185 being carried out for the layer data of all ink layers before the step 183 of depositing those layers is initiated, the layer data of each layer could be modified immediately before it is used to control the creation of the ink layer.

The positioning and dimensioning of the channel or channels used to segment an embossing die formed by a printed relief pattern depend on a number of factors ('input parameters') including the printing process, inks, and substrate to be used; the medium to be embossed; and the shape and size of the printed relief pattern to be built. Based on these input parameters and empirical data and placement rules regarding when the introduction of one or more channels is desirable and the effectiveness of various channel layouts and dimensions, a suitable positioning and dimensioning of the channel or channels to be introduced can be determined identifying (directly or otherwise) the regions of the printed relief pattern to be segmented, the layout, spacing and width of the channel(s), and which ink layers the channel(s) open through. This determination of the positioning and dimensioning of the channel(s) can be effected in advance of the operation of modifying the design data to introduce one or more channels (for example, either as an initial step of the die creation programs 180B, 180C depicted in FIGS. 2B, 2C respectively, or offline); alternatively, this determination can be effected as part of the design-data modification operation itself (for example as part of the design-data modification steps 184 and 185 of the programs 180B, 180C respectively).

Regarding the empirical data and placement rules that are used in the determination of the positioning and dimensioning of the channel(s) to be introduced into a particular embossing die as specified by the received design data, these data and rules may include some or all of the following:

- For a given print process, ink, substrate and media, the relationship between values of the height, length and breadth of any continuous region of the printed relief pattern that sets the boundary beyond which an increase in any dimension makes the introduction of one or more channels desirable.
- Suitable values for channel spacing given the dimensions of the region(s) of the printed relief pattern to be segmented by the introduction of one or more channels (but not less than any minimum spacing value that may be specified for reasons of stability of the printed relief pattern to be created—see next item).
- where multiple parallel channels are to be introduced, a suitable value for ratio S of minimum channel spacing to the maximum height of the embossing die to be created:

$$S = \frac{\text{Minimum channel spacing}}{\text{Maximum height of embossing die to be created}}$$

This lower limit on channel spacing is to avoid the channels having an adverse effects on the stability of the printed relief pattern that is to form the embossing die to be created. Typically S will have a value in the range 2 to 5.
- Suitable value for the ratio W of maximum channel width to media thickness to avoid the presence of the channels being visibly discernible in the embossed media:

$$W = \frac{\text{Maximum channel width}}{\text{Media thickness}}$$

Typically W will have a value in the range 0.3 to 1, for example, 0.5 (maximum channel width of half the media thickness). It will be appreciated that for the maximum channel width to be dynamically set using the value of W, an indication of the thickness of the media to be embossed using the embossing die being created needs to be received as input by the control and data processing subsystem 150.
- The desirability of not having a channel run along close to an edge of the printed relief pattern as this might destabilize that edge.
- The channel direction for best channel formation—since physical delineation of a channel in a printed relief pattern built from successively deposited ink layers depends on how well the elongate apertures formed in the ink layers line up to define the channel, absent other considerations, it is better to form a channel so that it runs transverse the direction of greatest alignment accuracy thereby ensuring that the channel side walls are formed as accurately as possible.

Even though several of the input parameters (in particular, print process, ink, substrate) may be taken as fixed, or at least constant for a number of embossing runs, the determination of the positioning and dimensioning of the channel(s) to be introduced into a printed relief pattern, can become quite involved if a full determination is made each time starting from the received design data and the raw empirical data and placement rules noted above. Accordingly, in some examples a predetermined channel layout, herein referred to as a “channel mask”, is used to segment all embossing designs though certain parameters of the channel mask, such as channel spacing and channel width, may still be made dependent on the aforesaid input parameters. Furthermore, several channel masks may be available for use, the particular channel mask chosen being dependent on the aforesaid input parameters.

In examples that effect segmentation using a channel mask, data, herein “channel-mask data”, specifying the channel mask (with the values of any variable parameters of the channel mask determined), is combined with the embossing design data specifying the printed relief pattern to be built, to modify that design data and thereby introduce channels matching the channel mask into the printed relief pattern.

FIGS. 11A-F show six example channel masks; in FIG. 11 the depth direction of the channels is at right angles to the plane of the drawing sheet.

Figure 11A:
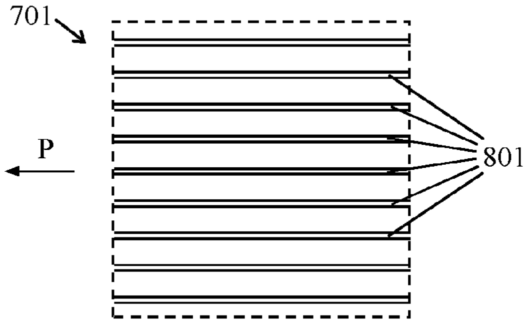
FIG. 11A-F show respective predetermined channel layouts for use in respective further examples of the invention in segmenting printed relief patterns that are to serve as embossing dies.

FIG. 11A depicts a channel mask 701 in which parallel, evenly-spaced, channels 801 run in the process direction P of the print engine.

Figure 11B:
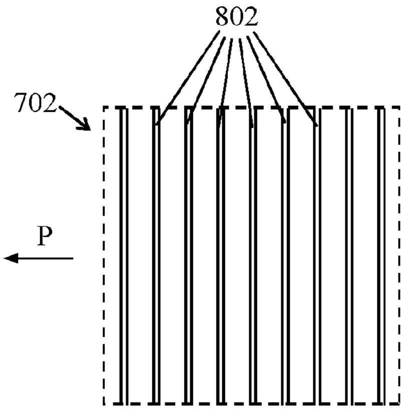

FIG. 11B depicts a channel mask 702 in which parallel, evenly-spaced, channels 802 run at right angles to the process direction P of the print engine.

Figure 11C:
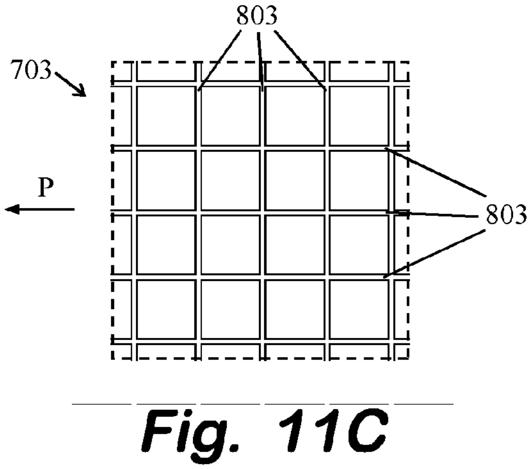

FIG. 11C depicts a channel mask 703 in which two sets of parallel, evenly-spaced, channels 803 run at right angles to each other to form a grid pattern.

Figure 11D:
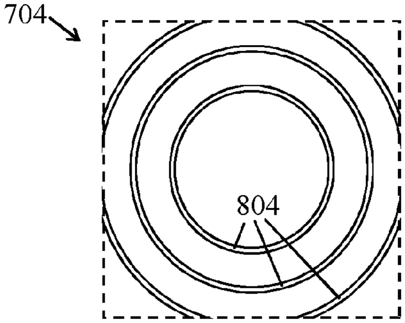

FIG. 11D depicts a channel mask 704 in which circular channels 804 of increasing radius are concentrically arranged.

Figure 11E:
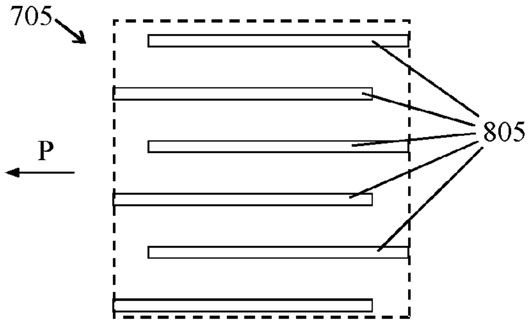

FIG. 11E depicts a channel mask 705 in which parallel, evenly-spaced, channels 805 run in the process direction P of the print engine but alternately terminate short of opposite edges of the mask.

Figure 11F:
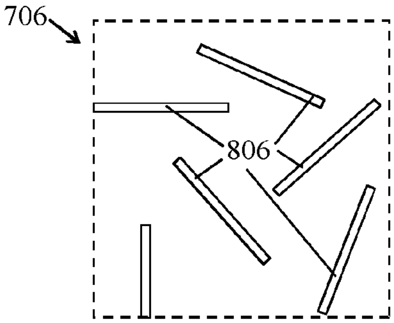

FIG. 11F depicts a channel mask 706 in which straight channels 804 of fixed extent and running at different angles are pseudo-randomly arranged to ensure no large gaps exist between neighboring channels.

Channel masks with different arrangements of channels to those depicted in FIG. 11 are, of course, possible.

For simplicity, the channels of a channel mask are taken as extending depthwise through all ink layers; however, it is also possible to specify that some or all of the channels in a mask extend depthwise through only some of the ink layers (for example, through all layers except the lowest n layers where n is a specified integer).

Several example channel-mask based examples of increasing sophistication will now be described; in all these examples, it will be assumed that the width of the channels is either fixed in value or set in dependence on the thickness of the media to be embossed (for example, channel width may be set to half the media thickness—that is, the above-noted ratio W has a value of 0.5). Also, the above-described placement rule about not running channels too close to an edge of the printed relief pattern to be built is followed in all the following examples s.

In a first channel-mask based example, a predetermined channel mask (for example, the mask 701 shown in FIG. 11A) is used to determine the segmentation of the embossing die (the printed relief pattern) specified by each new input of embossing design data. In this example, the parameters of the channel mask (except possibly channel width) are fixed rather than being set in dependence on the details of the design to be embossed; thus, the channel spacing is fixed, for example, at a value equal to S times the maximum height of printed relief pattern die that can be built by the print engine (a typical value for the maximum buildable height is 600 micrometers, and as already noted S typically has a value in the range 2-5). Furthermore, the channels defined by the channel mask are applied over all regions of the printed relief pattern defined by the design data, and over the full height of the latter (that is, the channels open through all ink layers). It will be appreciated that in this example determining the form and placement of the channels and modifying the embossing design data accordingly is relatively straightforward.

In a second channel-mask based example, the approach used in the first channel-mask based example is modified by making the channel spacing dependent on the maximum height of the embossing die to be created; more specifically, for a currently specified value of the above-described parameter S, the channel spacing is set to a value equal to, or greater than, S times the maximum height of the embossing die to be created.

In a third channel-mask based example, the approach used in the first or second channel-mask based example is modified by having the channels open through only some of the ink layers used to build the printed relief pattern that is to form the embossing die. For example, each channel may open through all ink layers except for the topmost and bottommost ink layer or layers in the region of the channel.

In a fourth channel-mask based example, the approach used in the first, second or third channel-mask based example is modified by using several different channel masks applied to different respective sets of ink layers; for example, the channel mask 701 may be applied to the lower layers of a particular design and the channel mask 702 applied to the higher layers of the same design.

Figure 12:
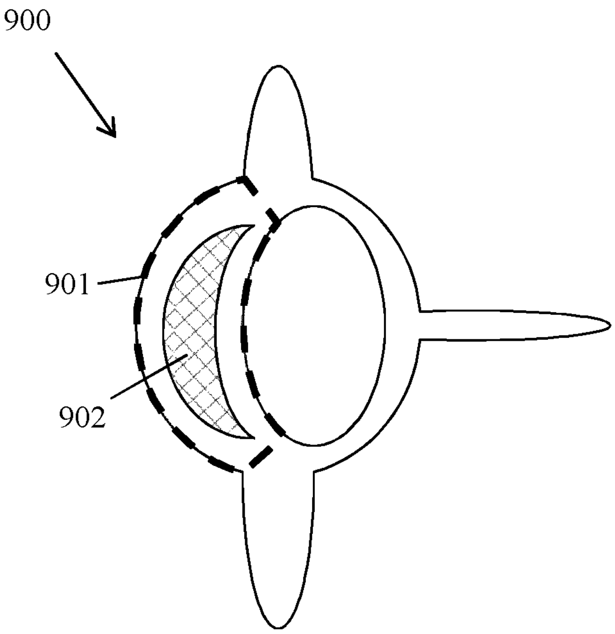
FIG. 12 is a plan view of an embossing design indicating a region of the corresponding printed relief pattern to be built that is to be partially segmented by the introduction of channels in accordance with another example of the invention.

In a fifth channel-mask based example, the approach used in the first, second, third or fourth channel-mask based example is modified by applying the channel mask(s) only to selected regions of the printed relief pattern to be built, these regions being those having one or more dimensions that exceed corresponding threshold values. Thus, for the example printed relief pattern 900 shown in plan in FIG. 12, the only region having a dimension exceeding the corresponding threshold value may be the region shown within the thick dashed boundary 901; after taking account of the need to avoid running channels too close to edges of the printed relief pattern, a selected channel mask (such as mask 706) is applied to the area 902 shown cross-hatched.

It will be appreciated that many variations are possible to the above described method and apparatus for creating an embossing die segmented by one or more channels. The preceding description has been presented only to illustrate and describe examples of the principles described. This description is not intended to be exhaustive or to limit these principles to any precise form disclosed.

Thus, in a variant concerning the example die creation programs 180A-C (FIGS. 2A-C), instead of the layer data for all layers being created and stored in step 182 prior to the deposition of the first ink layer on the photoconductive drum 105, each layer can be handled in turn, its layer data being determined in step 182 and the layer then being printed in step 183 (step 182 being temporarily suspended while the layer it has just determined is printed); in this case, where the modification of the design data to introduce channels is carried out by modifying the layer data (as in die creation program 180C), the modification is effected for each layer in turn either integrally with the determination of the corresponding layer data or following initial determination of the latter and prior to printing of the ink layer concerned.

In another variant, instead of the layer data being generated by the printing system used to create an embossing die as a printed relief structure from printed ink layers, the layer data can be generated from the initial embossing design data by an independent data processing arrangement and then supplied (for example, over a computer network or on portable storage media) to the printing system for use. In this case, modification of the design data to introduce channels into the printed relief structure can also be done by the independent data processing arrangement in which case the channels will be specified in the layer data provided to the printing system; alternatively, the modification of the design data to introduce channels into the printed relief structure can be done by the control and processing sub-system of the printing system, the modification being done to the layer data supplied to the printing system. It will be appreciated that although the design data may only be transferred from the independent data processing arrangement to the printing system on a portable storage medium, the independent data processing arrangement is still effectively operatively coupled to the print engine of the printing system.

In the foregoing description the initial embossing design data and the data specifying the channel layouts to be applied will normally be provided as binary electronic data and be processed by a suitable digital data processing arrangement to incorporate channels into the design data by modifying the latter. However, the initial embossing design data and channel data could be provided in other forms, for example in graphical form; in this latter case, the channels graphically represented in the channel data could be photographically incorporated into the design data particularly whether the design data is a 2D representation (as discussed above). The resultant graphical representation of the modified design data can be subsequently converted to a format (in particular, a digital data format) suitable for the printing system to be used to create the embossing die corresponding to the design data.

Although in the examples described above, the channels have been assumed to be empty (that is, filled with nothing other than the surrounding atmosphere), it would alternatively be possible to fill the channels with a medium which provides support to the channel walls (to assist in stability of the printed relief pattern) but which does not adhere to the layers of the printed relief pattern and contracts on cooling as least as much as the ink layers so that it does not increase the tendency of the printed relief pattern to peel off the substrate. This medium is, for example, applied in the same way as the ink used to build the printed relief pattern.

The invention claimed is:

1. A method comprising:

receiving design data specifying a design to be embossed;

performing a plurality of times:

selectively discharging a precharged electrostatic drum of a printing device in accordance with the design to be embossed, which forms a latent image on the electrostatic drum corresponding to the design to be embossed;

applying ink to discharged portions of the electrostatic drum that form the latent image corresponding to the design to be embossed; and transferring the applied ink from discharged portions of the electrostatic drum to an impression cylinder of the printing device via an intermediary cylinder of the printing device, which forms an embossing die on the impression cylinder as multiple ink layers constituting a printed relief pattern in accordance with the design data;

after forming the embossing die, advancing a medium between the intermediary cylinder and the impression cylinder, the embossing die embossing the design onto the medium; and while the medium is advancing between the intermediary cylinder and the impression cylinder, printing an image on the medium via the intermediary cylinder using ink.

2. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design, wherein said one or more channels, introduced by the modifying of the design data, are introduced only into regions of the printed relief pattern that exceed a threshold value in at least one dimension.

3. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design, wherein at least one said channel, introduced by the modifying of the design data, extends depth-wise through only some of the ink layers of the printed relief pattern such that a bottom and/or top of at least a length of the channel is spanned by an ink layer.

4. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design, wherein at least one said channel, introduced by the modifying of the design data, terminates short of an edge of the printed relief pattern that it would otherwise meet.

5. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design;

receiving an input indicative of a thickness of media to be embossed using the embossing die, the modifying of the design data including setting a width of said one or more channels to a value no greater than a predetermined multiple W of the indicated thickness of the media to be embossed where W has a value in the range 0.3 to 1.

6. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design, wherein the modifying of the design data introduces multiple parallel channels into the printed relief pattern to be built, a spacing of the channels being at least equal to a predetermined multiple S of a maximum height of the printed relief pattern to be built where S has a value in the range 2 to 5.

7. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design;

converting the design data from a form in which the design data is received into layer data specifying each ink layer to be printed, the modifying of the design data to introduce one or more channels being effected to the layer data.

8. The method according to claim 1, further comprising:

modifying the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design, wherein the modifying of the design data to introduce one or more channels is effected by applying at least one predetermined channel layout to some or all the ink layers of one or more regions of the printed relief pattern to be built.

9. The method according to claim 8, wherein said at least one predetermined channel layout comprises at least one of the following layouts:

equally spaced channels extending parallel to a process direction (P) of a printing process used to form the embossing die by printing multiple ink layers in superposition;

equally spaced channels extending transverse to the process direction (P) of a printing process used to form the embossing die by printing multiple ink layers in superposition;

a grid of two orthogonal sets of equally spaced channels;

concentric circular channels of different diameter.

10. The method according to claim 8, wherein at least one parameter of said at least one predetermined channel layout is set in dependence on one or more parameters of the design to be embossed, and/or a media to be embossed, and/or a printing process used to form the embossing die by printing multiple ink layers in superposition.

11. The method according to claim 1, further comprising, after the embossing die has been formed on the impression cylinder:

receiving image data specifying the image to be printed on the medium;

selectively discharging the precharged electrostatic drum in accordance with the image data, which forms the latent image on the electrostatic drum corresponding to the image to be printed; and applying the ink to the discharged portions of the electrostatic drum that forms the latent image corresponding to the image to be printed, wherein printing the image on the medium comprises transferring the applied ink from the discharged portions of the electrostatic drum to the medium via the intermediary cylinder, which prints the image on the medium as an ink layer in accordance with the image data.

12. The method according to claim 1, wherein the design is embossed onto the medium at a same time at which the image is printed on the medium.

13. An apparatus comprising:

an electrostatic drum that is chargeable and selectively dischargeable, and that is receptive to application of ink on discharged portions thereof;

an intermediary cylinder;

an impression cylinder to receive ink from discharged portions of the electrostatic drum via the intermediary cylinder;

a data processing arrangement to:

receive design data specifying a design to be embossed;

perform a plurality of times:

precharge the electrostatic drum;

selectively discharge the electrostatic drum in accordance with the design to be embossed, which forms a latent image on the electrostatic drum corresponding to the design to be embossed;

apply the ink to discharged portions of the electrostatic drum that form the latent image corresponding to the design to be embossed; and transfer the applied ink from the discharged portions of the electrostatic drum to the impression cylinder via the intermediary cylinder, which forms an embossing die on the impression cylinder as multiple ink layers constituting a printed relief pattern in accordance with the design data;

after forming the embossing die, advance a medium between the intermediary cylinder and the impression cylinder, the embossing die embossing the design onto the medium; and while the medium is advancing between the intermediary cylinder and the impression cylinder, printing an image on the medium via the intermediary cylinder using ink.

14. The apparatus according to claim 13, wherein the data processing arrangement is further arranged to:

modify the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design;

receive an input indicative of a thickness of media to be embossed using the embossing die; and in modifying the design data, set a width of said one or more channels to a value no greater than a predetermined multiple W of the indicated thickness of the media to be embossed where W has a value in the range 0.3 to 1.

15. The apparatus according to claim 13, wherein the data processing arrangement is further arranged to:

modify the design data after receipt to introduce into the printed relief pattern to be built, one or more channels which extend depth-wise through the multiple ink layers of the printed relief pattern and serve to fully or partially segment the printed relief pattern, modification of the design data transforming the design into a three-dimensional design, wherein in modifying the design data to introduce one or more channels, the data processing arrangement applies at least one predetermined channel layout to some or all the ink layers of one or more regions of the printed relief pattern to be built.

16. The apparatus according to claim 13, wherein the data processing arrangement is further arranged to, after the embossing die has been formed on the impression cylinder:

receive image data specifying an image to be printed on the medium;

selectively discharge the precharged electrostatic drum in accordance with the image data, which forms a latent image on the electrostatic drum corresponding to the image to be printed; and apply ink to discharged portions of the electrostatic drum that forms the latent image corresponding to the image to be printed, wherein the data processing arrangement is to print the image on the medium by transferring the applied ink from the discharged portions of the electrostatic drum to the medium via the intermediary cylinder, which prints the image on the medium as an ink layer in accordance with the image data.

17. The apparatus according to claim 13, wherein the design is embossed onto the medium at a same time at which the image is printed on the medium.

* * * * *